US011955076B2

(12) United States Patent
Hoon Lee et al.

(10) Patent No.: US 11,955,076 B2
(45) Date of Patent: Apr. 9, 2024

(54) DYNAMIC POWER CONVERTER SWITCHING FOR DISPLAYS BASED ON PREDICTED POWER USAGE

(71) Applicant: Google LLC, Mountain View, CA (US)

(72) Inventors: Ji Hoon Lee, Atlanta, GA (US); Sun-il Chang, San Jose, CA (US); Sang Young Youn, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/756,319

(22) PCT Filed: Jul. 10, 2020

(86) PCT No.: PCT/US2020/041613

§ 371 (c)(1),
(2) Date: May 23, 2022

(87) PCT Pub. No.: WO2022/010490

PCT Pub. Date: Jan. 13, 2022

(65) Prior Publication Data

US 2022/0415256 A1 Dec. 29, 2022

(51) Int. Cl.
*G09G 3/3233* (2016.01)
*G09G 3/3258* (2016.01)

(52) U.S. Cl.
CPC ......... *G09G 3/3233* (2013.01); *G09G 3/3258* (2013.01); *G09G 2330/021* (2013.01)

(58) Field of Classification Search
CPC .................................................... G09G 3/3233
USPC ........................................................... 345/77
See application file for complete search history.

(56) References Cited

U.S. PATENT DOCUMENTS

| | | | | |
|---|---|---|---|---|
| 10,234,926 | B2 | 3/2019 | Gatson et al. | |
| 2009/0109147 | A1* | 4/2009 | Park | G09G 3/3233 345/76 |
| 2016/0358526 | A1 | 12/2016 | Wang et al. | |
| 2017/0018230 | A1 | 1/2017 | Im et al. | |
| 2017/0178559 | A1 | 6/2017 | Kim | |
| 2020/0134394 | A1* | 4/2020 | Teshome | G06F 18/25 |
| 2020/0219429 | A1 | 7/2020 | Callway et al. | |
| 2020/0335046 | A1* | 10/2020 | Ryu | G09G 3/3233 |

OTHER PUBLICATIONS

Chen, "Smartphone Power Consumption Characterization and Dynamic Optimization Techniques for OLED Display," University of Pittsburgh ProQuest Dissertations Publishing, May 23, 2016, 99 pp.
International Search Report and Written Opinion of International Application No. PCT/US2020/041613, dated Mar. 12, 2021, 24 pp.

(Continued)

*Primary Examiner* — Long D Pham
(74) *Attorney, Agent, or Firm* — Shumaker & Sieffert, P.A.

(57) ABSTRACT

An example method includes estimating, based on content to be displayed at a display of a mobile computing device at a future time, an amount of power to be used by the display at the future time; selecting, based on the estimated power level, a power converter of a plurality of power converters of the mobile computing device, each of the plurality of power converters optimized for a different output power range; and causing electrical power from the selected power converter to be supplied to the display at the future time.

15 Claims, 12 Drawing Sheets

(56) References Cited

OTHER PUBLICATIONS

International Preliminary Report on Patentability from International Application No. PCT/US2020/041613 dated Jan. 19, 2023, 19 pp.
Response to Communication Pursuant to Rules 161(1) and 162 EPC dated Dec. 21, 2022, from counterpart European Application No. 20753515.4, filed Jun. 14, 2023, 18 pp.

* cited by examiner

DYNAMIC POWER CONVERTER SWITCHING FOR DISPLAYS BASED ON PREDICTED POWER USAGE

This application is a national stage entry of International Patent Application No. PCT/US2020/041613, filed 10 Jul. 2020, the entire contents of which is incorporated herein by reference.

BACKGROUND

Display devices may include light emitting elements that generate light using electrical energy. For instance, an organic light emitting diode (OLED) display device may include a matrix of OLEDs that each generate light using electrical energy. The amount of electrical energy consumed by a light emitted element may be related to what is being displayed by the display. For instance, an OLED display may consume more power when displaying a brighter image than when displaying a darker image.

SUMMARY

In general, aspects of this disclosure are directed to systems that include power converters that supply electrical power to a display (e.g., to light emitting elements of the display). A display may consume varying amounts of power based on what is being displayed (e.g., based on the brightness of what is being displayed). Power converters may be designed to operate efficiently (e.g., output power vs. input power) in certain ranges. For instance, a particular power converter may be optimized to supply load currents in a range from 60 milliamps (mA) to 300 mA. When a display supplied by the particular power converter draws an amount of current outside the optimized range, the particular power converter is still able to supply the required power, but with reduced efficiency. A system may include a plurality of power converters configured to supply electrical power to a display, each optimized for a different output load current range. A controller of the system may select a power converter of the plurality of power converters to supply power to the display. However, selecting the power converter based on amount of power currently used by the display may not be desirable. For instance, if the selected power converter is not the optimal power converter for the amount of power presently being used by the display, the controller may switch to the optimal power converter. However, such mid-frame switching may introduce flickering, which may be undesirable. As such, the controller may need to select between the non-desirable options of using a non-optimal power converter and introducing flickering.

In accordance with one or more techniques of this disclosure, a controller of a device may select a power converter from a plurality of power converters to supply power to a display based on an amount of power predicted to be used by the display at a future time. For instance, a controller of a device may estimate, based on content of frame N, an amount of power to be used by a display of the device to output frame N at a future time. The controller may select a power converter that matches the estimated amount of power and cause electrical power from the selected power converter to be supplied to the display at the future time (i.e., while the display is outputting frame N). As such, the power converter of the plurality of power converters that can most efficiently supply the amount of power used by the display will be dynamically used without introducing flickering. In this way, the techniques of this disclosure enable a reduction in the amount of power used to drive displays.

In one example, a method includes estimating, based on content to be displayed at a display of a mobile computing device at a future time, an amount of power to be used by the display at the future time; selecting, based on the estimated power level, a power converter of a plurality of power converters of the mobile computing device, each of the plurality of power converters optimized for a different output power range; and causing electrical power from the selected power converter to be supplied to the display at the future time.

In another example, a device includes a display; a plurality of power converters configured to supply electrical power to the display, each optimized for a different output power range; and circuitry configured to estimate, based on content to be displayed at the display at a future time, an amount of power to be used by the display at the future time; select, based on the estimated power level, a power converter of the plurality of power converters; and cause electrical power from the selected power converter to be supplied to the display at the future time.

In another example, a device includes a plurality of power converters configured to supply electrical power to a display, each optimized for a different output load current range, wherein each power converter of the plurality of power converters includes a respective set of ELVDD and ELVSS power converters; means for estimating, based on content to be displayed at a display of the device at a future time, an amount of power to be used by the display at the future time; means for selecting, based on the estimated power level, a power converter of the plurality of power converters; and means for causing electrical power from the selected power converter to be supplied to the display at the future time.

The details of one or more examples are set forth in the accompanying drawings and the description below. Other features, objects, and advantages of the disclosure will be apparent from the description and drawings, and from the claims.

DETAILED ABSTRACT OF THE INVENTION

Figure 1:
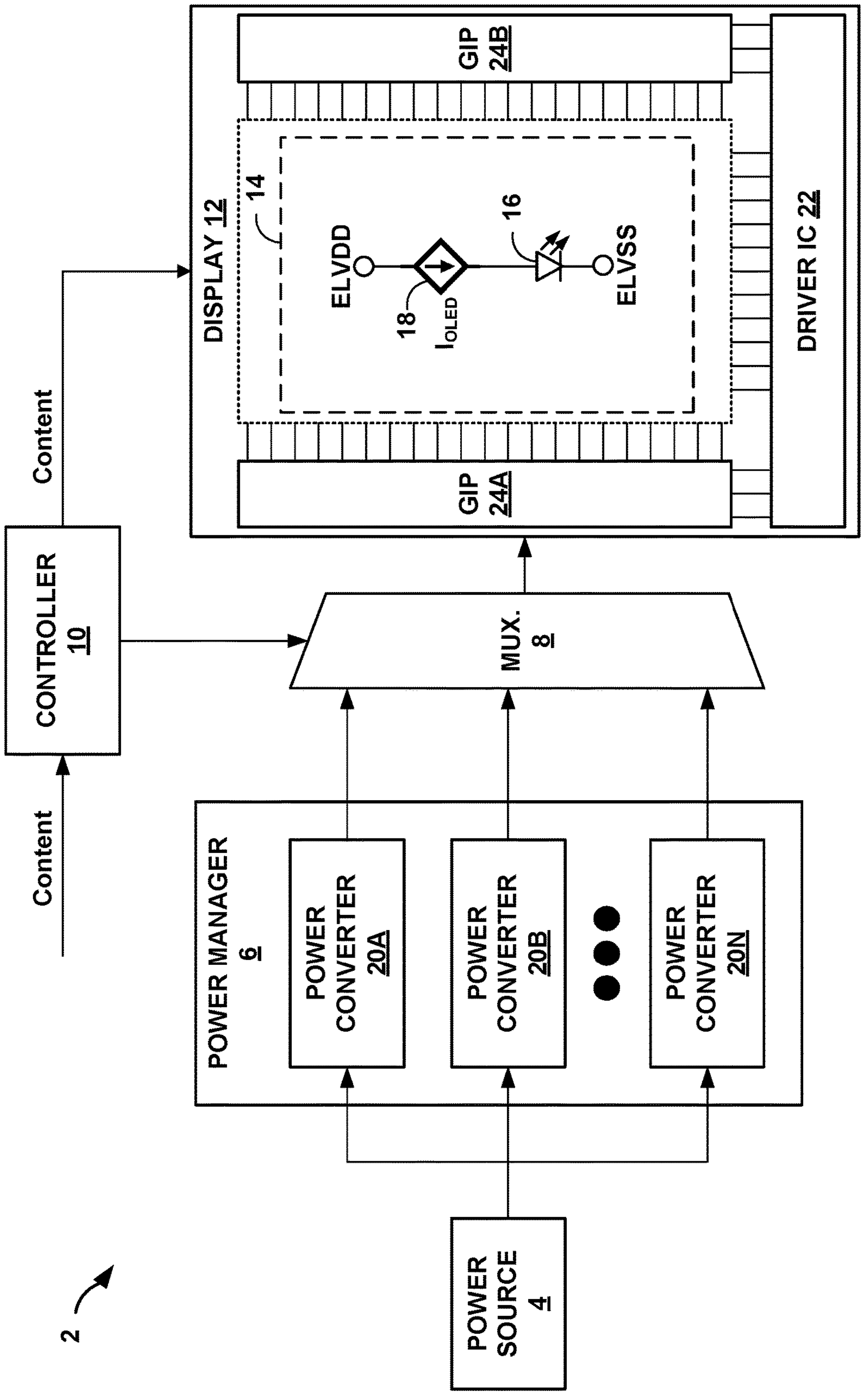
FIG. 1 is a block diagram illustrating a device that includes a plurality of power converters configured to supply electrical power to a display, in accordance with one or more aspects of this disclosure.

FIG. 1 is a block diagram illustrating a device that includes a plurality of power converters configured to supply electrical power to a display, in accordance with one or more aspects of this disclosure. As shown in FIG. 1, device 2, includes, power source 4, power manager 6, multiplexer 8, controller 10, and display 12.

In the example of FIG. 1, device 2 can be any device that includes a display. Examples of device 2 include, but are not limited to, a mobile phone, a camera device, a tablet computer, a smart display, a laptop computer, a desktop computer, a gaming system, a media player, an e-book reader, a television platform, a vehicle infotainment system or head unit, or a wearable computing device (e.g., a computerized watch, a head mounted device such as a VR/AR headset, computerized eyewear, a computerized glove).

Power source 4 may be any component capable of supplying electrical power to other components of device 2. Examples of power source 4 include, but are not limited to, batteries (primary cells, secondary cells, or combinations thereof), photovoltaic panels, mechanical generators, fuel cells, or any other device capable of providing electrical power.

Power manager 6 may include one or more components capable of processing and supplying electrical power for use by other components of device 2, such as display 12. In some examples, power manager 6 may be a plurality of components separately attached to a board (e.g., a printed circuit board) of device 2. In some examples, one or more components of power manager 6 may be included in an integrated circuit, which may be referred to as a power management integrated circuit (PMIC). Power manager 6 may be capable of concurrently supplying at least two power signals (e.g., for use by display 12). For instance, where display 12 is an organic light emitting diode (OLED) display, power manager 6 may include a power converter configured to supply an ELVDD power signal and an ELVSS power signal. In some examples, power manager 6 may be capable of five power signals. Such power signals may include the ELVDD power signal, the ELVSS power signal, an AVDD power signal (e.g., an analog power signal for pixel data drivers and a timing controller), VDDI and VCI power signals (e.g., digital power for peripheral blocks).

Display 12 may be capable of rendering data into images viewable by a user of device 2. For example, display 12 may include a matrix of pixels that are individually controllable. Examples of display 12 include, but are not limited to, liquid crystal displays (LCD), light emitting diode (LED) displays, organic light-emitting diode (OLED) displays (including, for example, active-matrix organic light-emitting diode (AMOLED)), microLED displays, or similar monochrome or color displays capable of outputting visible information to a user of device 2.

Display 12 may include one or more light emitting elements, operation of which may be controlled via gate in plane (GIP) 24A and 24B along with driver IC 22. The light emitting elements may form a backlight for a display or may form pixels of a display. As one example, where display 12 is an LCD display, display 12 may include one or more light emitting elements arranged as a backlight. As another example, where display 12 is an OLED display or a microLED display, display 12 may include a plurality of light emitting elements individually operating as pixels.

An example circuit of a single light emitting element of display 12 is shown in box 14 of FIG. 1. For simplicity, only a single light emitting element is shown. However, it is understood that display 12. includes a plurality of circuits that perform operations similar to the example circuit shown in box 14. As shown in box 14, light emitting element 16 (e.g., a light emitting diode (LED)) may be coupled to an ELVSS node and current source 18. The ELVSS node and the ELVDD node may be respectively supplied by the ELVSS and ELVDD power signals generated by power manager 6. The state of current source 18 may control the amount of current that flows through light emitting element 16. The amount of light emitted by light emitting element 16 is a function of an intrinsic factor of light emitting element 16 (e.g., eta or $\eta$) and the amount of current flowing through light emitting element 16 (e.g., $I_{OLED}$). For instance, the amount of light emitted by light emitting element 16 may be given by the following equation $L=\eta*I_{OLED}$, where L is the amount of light emitted by light emitting element 16. As such, the amount of current provided by current source 18, $I_{OLED}$, is a function of several parameters such as a display brightness setting (e.g., display brightness value (DBV)) and content to be displayed (e.g., a red-green-blue (RGB) value). In other words, $I_{OLED}\sim f(DBV, R, G, B)$.

As can be seen from above, the amount of power consumed by the light emitting elements of display 12 may vary based on the image being formed by display 12. For instance, light emitting elements of display 12 may consume more power (e.g., a higher current level) when display 12 is displaying a brighter image than when display 12 is displaying a darker image.

The total amount of power used by display 12 may be a function of emission power, data power, and gate driving power. The emission power may be the power actually used by light emitting elements. As discussed above, the power used by light emitting elements may be a function of the display brightness value (DBV) and content to be displayed. The emission power may be generated using the ELVDD and the ELVSS power rails (e.g., provided by power manager 6). The analog data power may be the power used to adjust the output of the light emitting elements (e.g., used by driver IC 22). As discussed in further detail below, the analog data power may be a function of a data line capacitance, the DBV, a frame rate, and the content to be displayed. The analog data power may be generated using the AVDD power rail (e.g., provided by power manager 6). The gate driving power may be the power used to drive various gates of display 12, such as gates of gate-in-panel (GIP) modules 24A and 24B. The gate driving power may be generated using the AVDD power rail (e.g., provided by power manager 6). As discussed in further detail below, the gate driving power may be a function of a data line capacitance, the DBV, the frame rate, and the content to be displayed.

As discussed above, power manager 6 may include a power converter configured to supply power signals (e.g., AVDD, ELVDD, and ELVSS) that may be used to drive light emitting elements of display 12 or other components of display 12 (e.g., driver IC 22, GIP 24A, and GIP 24B). Examples of such a power converter include DC/DC converters such as buck, boost, buck-boost, Cuk (also known as a two inductor inverting converter), flyback, or any other type of DC/DC converter. In one specific example, power manager 6 may include a boost converter configured to generate the ELVDD power signal and a buck-boost converter configured to generate the ELVSS power signal. By their nature, power converters have different efficiencies under different operational conditions (e.g., efficiency may be a function of output current). In general, efficiency may be considered to be the amount of power provided by a power converter relative to the amount of power consumed by the power converter. For instance, a power converter that consumes 10 watts (W) of power while outputting 9 W may be considered to be 90% efficient. Values of components of a power converter may influence the efficiency of the power converter and may thus be selected to achieve certain efficiency targets. For instance, the values of inductors and capacitors of the power converter of power manager 6 may be selected to provide optimal efficiency at a normal operating current level of display 12.

However, in some examples, a display, such as display 12, may be operated such that there is no one normal operating current level. For instance, in addition to a normal mode in which images are displayed with normal brightness and display 12 consumes a normal operating current level (e.g., between approximately 50 mA and 200 mA), device 2/display 12 may operate in a dark mode in which images are altered so as to appear darker (e.g., with a lower brightness than the normal mode) and display 12 consumes a reduced operating current level (e.g., between approximately 10 mA and 50 mA), a lock mode in which limited information is displayed (e.g., just the time, date, etc.), and/or any other mode in which the operating current level of display 12 is different than the normal operating current level.

In order to reduce the total amount of power consumed to display images, power manager 6 may include a plurality of power converters 20A-20N (collectively, "power converters 20") that are each optimized for a different output load current range. For instance, as opposed to including only a single set of ELVDD/ELVSS power converters, power converters 20 may each include a respective set of ELVDD/ELVSS power converters optimized to supply electrical power to display 12 at a different current range.

In operation, controller 10 may dynamically switch which power converter of power converters 20 is supplying electrical power to display 12. For instance, controller 10 may measure an amount of power presently being used by display 12 (e.g., an amount of current used by display 12), select, based on the measured power level, a power converter of power converters 20, and cause electrical power from the selected power converter of power converters 20 to be supplied to display 12. However, switching power converters based on an amount of power presently being used by display 12 may present one or more disadvantages. For instance, mid-frame power converter switching may introduce flickering. The amount of power used by display 12 is a function of content being displayed at display 12. Different frames of content may be drastically different, and as such require drastically different amounts of power. As such, if the selected power converter of power converters 20 is not the optimal power converter for the amount of power presently being used by display 12, controller 10 may switch to the optimal power converter of power converters 20. Such mid-frame switching may introduce flickering, which may be undesirable.

In accordance with one or more techniques of this disclosure, controller 10 may select a power converter from power converters 20 to supply power to display 12 based on an amount of power predicted to be used by display 12 at a future time. For instance, controller 10 may estimate, based on content of frame N, an amount of power to be used by display 12 to output frame N at a future time. Controller 10 may select a power converter of power converters 20 that matches the estimated amount of power and cause electrical power from the selected power converter to be supplied to display 12 at the future time. For instance, controller 10 may cause the selected power converter to supply power to display 12 while the display is outputting frame N, as opposed to switching to the selected power converter midway through the output of frame N. As such, the power converter of power converters 20 that can most efficiently supply the amount of power used by display 12 may be dynamically used without introducing flickering. In this way, the techniques of this disclosure enable a reduction in the amount of power used to drive display 12.

Controller 10 may be any controller or processor capable of performing the operations described herein. Examples of controller 10 include, but are not limited to, one or more digital signal processors (DSPs), general purpose microprocessors, application specific integrated circuits (ASICs), field programmable logic arrays (FPGAs), systems on a chip (SoC), or other equivalent integrated or discrete logic circuitry.

Figure 2:
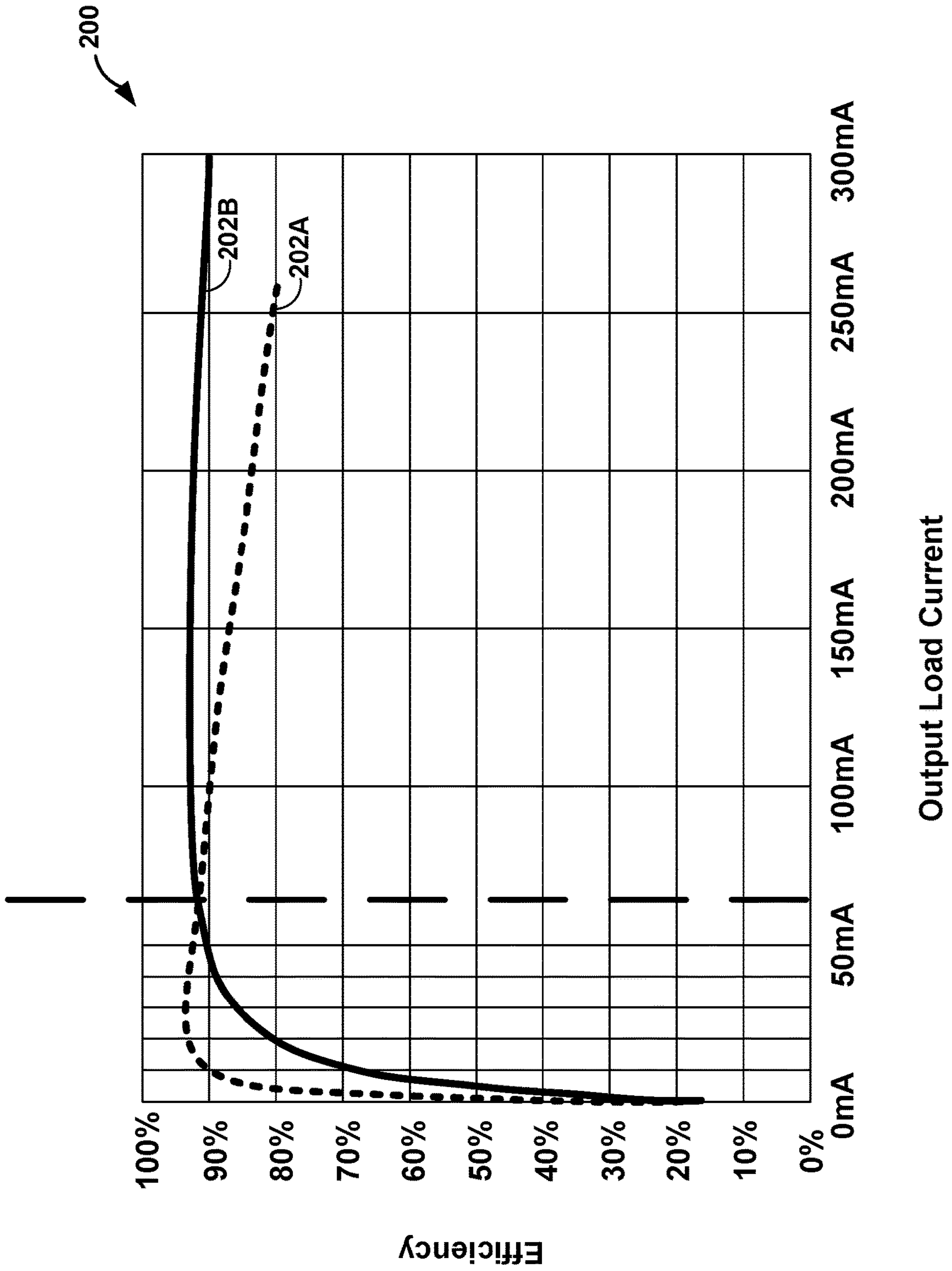
FIG. 2 is a graph illustrating example efficiencies across output load currents for various power converters of power converters, in accordance with one or more aspects of this disclosure.

FIG. 2 is a graph illustrating example efficiencies across output load currents for various power converters of power converters 20, in accordance with one or more aspects of this disclosure. As shown in FIG. 2, graph 200 includes a horizontal axis representing output load current of a power converter, a vertical axis representing efficiency of a power converter, and plots 202A and 202B representing example relationships between efficiency and output load current for various power converters. For instance, plot 202A may represent the relationship between efficiency and output load current for power converter 20A of FIG. 1 and plot 202B may represent the relationship between efficiency and output load current for power converter 20B of FIG. 1.

As can be seen from plots 202A and 202B in FIG. 2, power converters 20A and 20B may be optimized for efficient operation in different load current ranges. For instance, as can be seen from plot 202A, power converter 20A may be optimized for efficient operation from approximately 10 mA to approximately 50 mA. Similarly, as can be seen from plot 202B, power converter 20B may be optimized for efficient operation from approximately 50 mA to approximately 250 mA.

In operation, multiplexer 8 and/or controller 10 may enable dynamic switching between power converters 20. For instance, controller 10 may estimate a current level to be used by display 12 at a future time. As discussed in further detail below, controller 10 may estimate the current level based on one or more of a variety of factors such as a display brightness setting and content to be displayed by display 12. Controller 10 may select, based on the estimated current level, a power converter of power converters 20. For instance, controller 10 may select the power converter of power converters 20 that is optimized to supply electrical power at the estimated current level. Controller 10 may cause electrical power from the selected power converter to be supplied to display 12 at the future time. As one example, where device 2 includes multiplexer 8, controller 10 may cause multiplexer 8 to route ELVDD and ELVSS power signals from the selected power converter to display 12. As another example, (e.g., where multiplexer 8 is omitted and the outputs of all of power converters 20 are connected to common ELVSS and ELVSS nodes, such as shown in FIG. 3), controller 10 may cause the selected power converter of power converters 20 to output the power signals and cause the other power converters to refrain from outputting the power signals.

Figure 3:
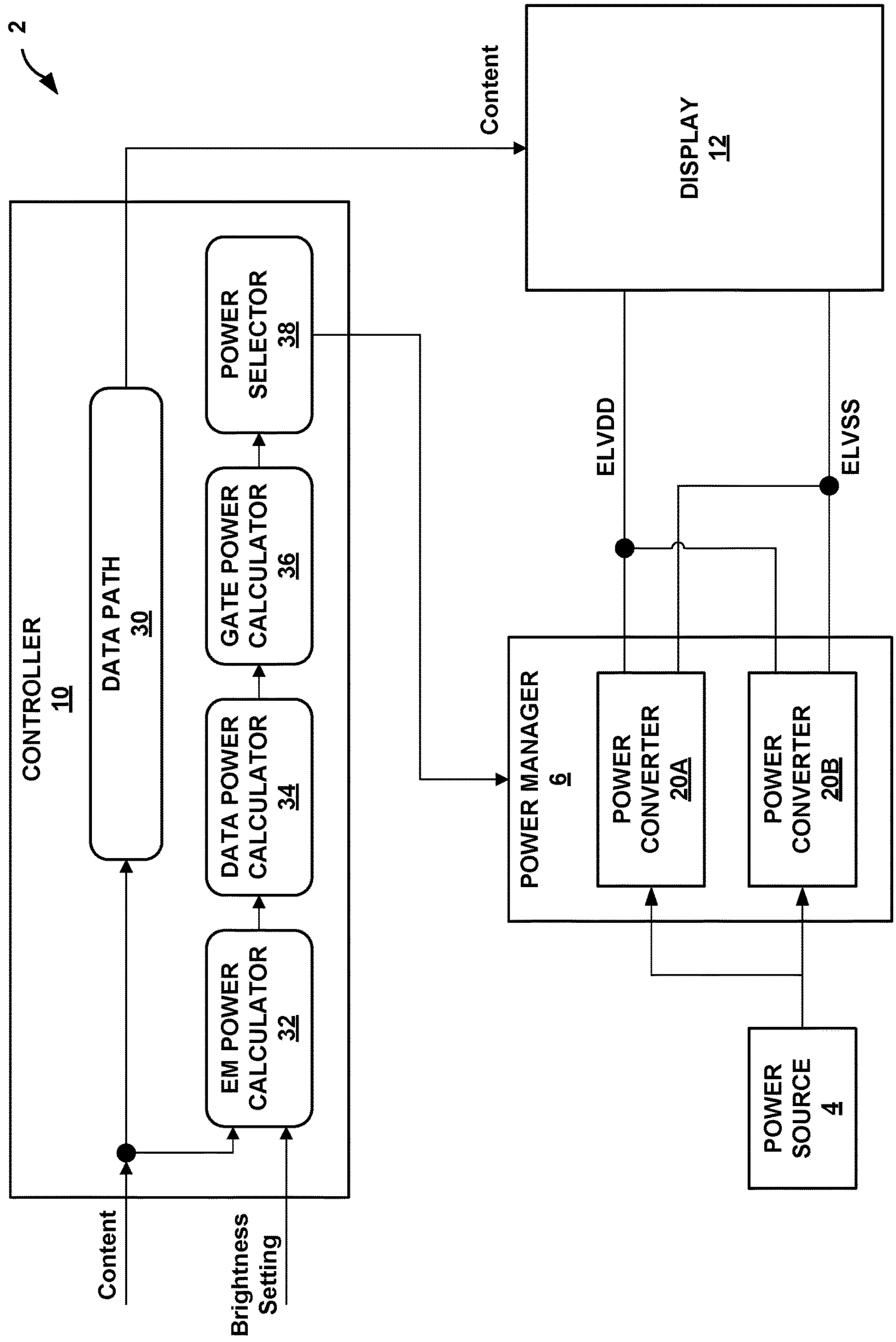
FIG. 3 is a block diagram illustrating details of another example of the device of FIG. 1, in accordance with one or more aspects of this disclosure.

FIG. 3 is a block diagram illustrating details of another example of the device of FIG. 1, in accordance with one or more aspects of this disclosure. As shown in the example FIG. 3 as opposed to FIG. 1, device 2 may omit multiplexer 8 and the outputs of power converters 20 may be connected to common nodes (e.g., an ELVDD node and an ELVSS node) which supply power to display 12. As discussed above, in such examples, controller 10 may dynamically control which power converter of power converters 20 supplies power by only operating the desired power converter and shutting down the other power converters.

As discussed above, controller 10 may enable dynamic switching between power converters 20. For instance, controller 10 may estimate a current level to be used by display 12 at a future time, select, based on the estimated current level, a power converter of power converters 20, and cause electrical power from the selected power converter to be supplied to display 12 at the future time.

As shown in FIG. 3, controller 10 may include data path 30, emission power (EM) calculator 32, data power calculator 34, gate power calculator 36, and power selector 38. Controller 10 may receive data from one or more other components of device 2. For instance, controller 10 may receive content, frame rate, and/or brightness settings from a central processing unit (CPU) of device 2. The content may represent what is to be displayed by display 12. For instance, the content may include pixel values (e.g., RGB values) that collectively form an image to be displayed by display 12. The brightness settings may indicate a general brightness level for operation of display 12. The brightness settings may be user controlled (e.g., via a slider or some other user interface element) and/or may be automatically controlled by device 2 (e.g., based on ambient light sensed via a light sensor).

Data path 30 may perform one or more actions to process the content before the content is provided to display 12. For instance, data path 30 may include one or more frame buffers that store frames of image data to be shown at display 12.

EM power calculator 32 may predict an amount of power to be used by light emitting elements of display 12 when outputting a particular frame. EM power calculator 32 may predict or estimate the EM power using any combination of theoretical, analytical, and machine learning techniques or models. To utilize the theoretical model or the analytical model, EM power calculator 32 may calculate the emission power using the following equation:

$$P_{EM} = f(DBV)\cdot\sum_{i-1}^{N}\sum_{j-1}^{M}[ELVDD - ELVSS]\cdot f(R, G, B)$$

In other words, EM power calculator 32 may sum, across all pixels of display 12, a function of the RGB value to be displayed at each pixel times a voltage difference between ELVDD and ELVSS. EM power calculator 32 may multiple this sum by a function of the display brightness value (DBV), assuming the same DBV is used for all pixels. The theoretical and analytical techniques may differ in their approaches to determining ƒ(DBV) and ƒ(R,G,B). To determine ƒ(DBV) and/or ƒ(R,G,B) using the theoretical technique, EM power calculator 32 may use models based on theoretical parameters of display 12. As one example, EM power calculator 32 may use the following theoretical equation to determine the function of the display brightness value:

$$f(DBV) = \begin{cases} \frac{L_{MAX\_NORM}}{4079}\cdot DBV & \text{Normal Mode} \\ \frac{L_{MAX\_HBM} - L_{MAX\_NORM}}{4095-4079}\cdot(DBV - 4079) + L_{MAX\_NORM} & HB\ \text{Mode} \end{cases}$$

where $L_{MAX\_NORM}$ is the maximum brightness level of a pixel of display 12 in the normal mode, and $L_{MAX\_HBM}$ is the maximum brightness level of a pixel of display 12 in the high brightness (HB) mode.

As another example, EM power calculator 32 may use the following theoretical equation to determine the function of the content to be displayed:

$$f(R,G,B)=\text{GAMMA2.2}$$

where GAMMA2.2 is the gamma value determined based on the R,G,B value.

To determine ƒ(DBV) and/or ƒ(R,G,B) using the analytical technique, EM power calculator 32 may use models based on measured parameters of display 12. As one example, EM power calculator 32 may use the following analytical equation to determine the function of the display brightness value:

$$f(DBV) = \begin{cases} 0.10538\cdot DBV + 0.0011724 & \text{Normal Mode} \\ 9.217\cdot DBV - 36709 & HB\ \text{Mode} \end{cases}$$

As another example, EM power calculator 32 may use the following analytical equation to determine the function of the content to be displayed:

$$f(R, G, B) = 0.6957e^{-9}R^3 + 0.5471e^{-6}R^2 - 0.3260e^{-5}R + 0.5748e^{-3} + 2.147e^{-10}G^3 + 0.4471e^{-6}G^2 - 0.2260e^{-5}G + 0.7348e^{-4} + 1.4957e^{-10}B^3 + 1.3471e^{-6}B^2 - 0.2220e^{-5}B + 1.1748e^{-4}$$

Where R is the gray code for the red value of content to be displayed at a pixel, G is the gray code for the green value of the content, and B is the gray code for the blue value of the content.

EM power calculator 32 may determine the emission power using machine learning through several techniques. The machine learning techniques may assist EM power calculator 32 in accounting for more complex aspects of display 12, such as panel load resistance. In particular, panel load resistance may cause the combined sum of the emission powers for each color component to not be equal to total emission power (e.g., $P_R+P_G+P_B \neq P_{RGB}$). In one example, EM power calculator 32 may use a machine learning (ML) model to determine new gray codes for the color components to account for this panel resistance. For instance, EM power calculator 32 may utilize a ML model to compute new gray codes (R', G', B') such that $P_R+P_G+P_B=P_{R'G'B'}$. This ML model may be trained based on past behaviors of display 12. EM power calculator 32 may use the ML derived new gray codes to determine the emission power. For instance, EM power calculator 32 may use the ML derived new gray codes to determine the emission power using the analytical or theoretical techniques discussed above. Additional or alternative techniques for using machine learning to determine the emission power are discussed below with reference to FIG. 6.

Data power calculator 34 may predict an amount of power to by used for analog data, such as by driver IC 22 (i.e., $P_{Data}$). Data power calculator 34 may predict $P_{Data}$ based on several parameters, including data line capacitance ($C_{Line}$), display brightness value (DBV), frame rate, and content (e.g., RGB data). Further details of one example of data power calculator 34 are discussed below with reference to FIG. 4.

Gate power calculator 36 for gate control, such as by GIP 24A and GIP 24B (i.e., $P_{GIP}$). Gate power calculator 36 may predict $P_{GIP}$. based on several parameters, including data line capacitance ($C_{Line}$), display brightness value (DBV), frame rate, and content (e.g., RGB data). Gate power calculator 36 may predict $P_{GIP}$. as a combination of one or more other power levels, such as a framerate-dependent scan gate driver power $P_{Scan}$, a pulse-width modulation (PWM)-dependent emission (EM) gate driver power $P_{EM2}$, and a miscellaneous power $P_{Misc}$ (e.g., scan clock, $V_{GH}/V_{GL}$ generation, etc.). As such, in some examples, gate power calculator may calculate $P_{GIP}=P_{Scan}+P_{EM2}+P_{Misc}$.

Figure 4A:
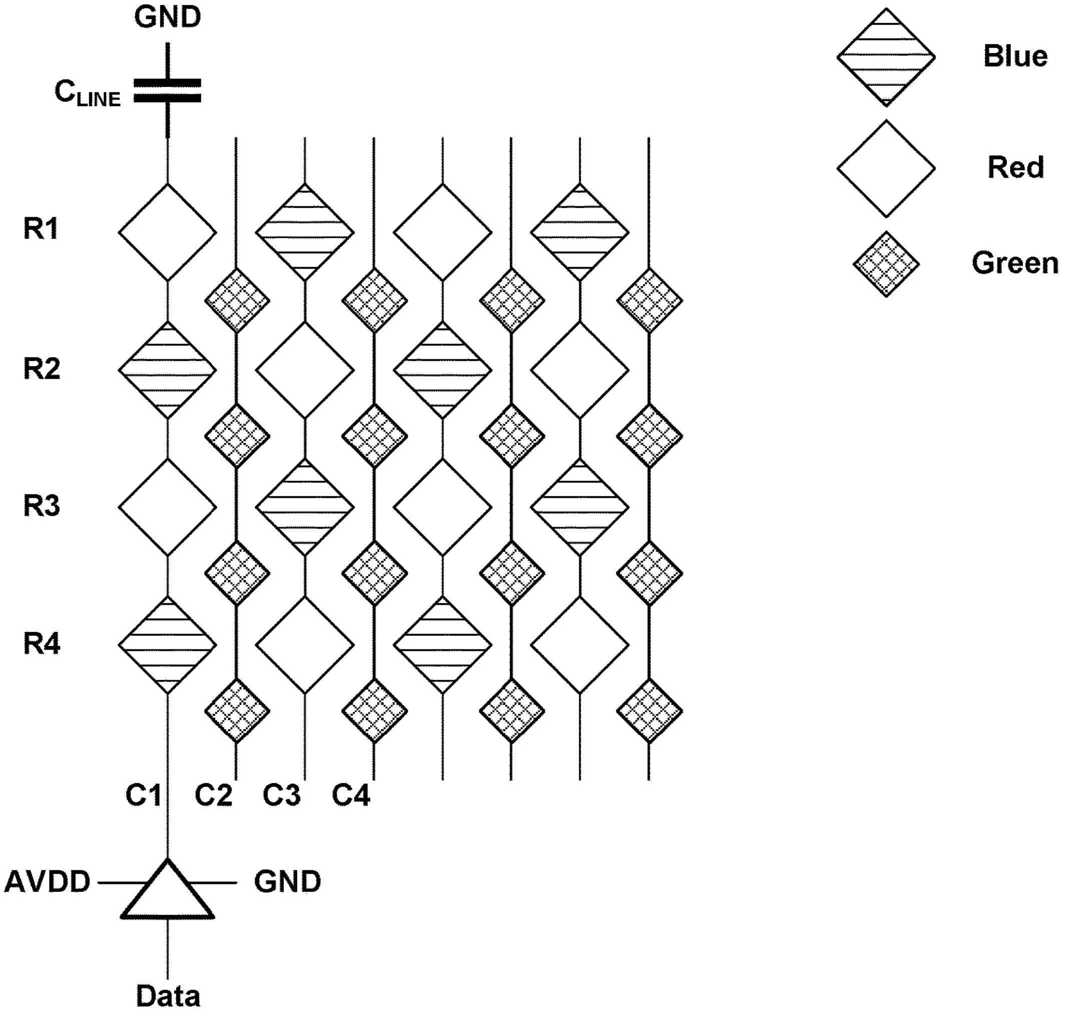
FIGS. 4A and 4B are conceptual diagrams illustrating analog data power, in accordance with one or more aspects of this disclosure.
Figure 4B:
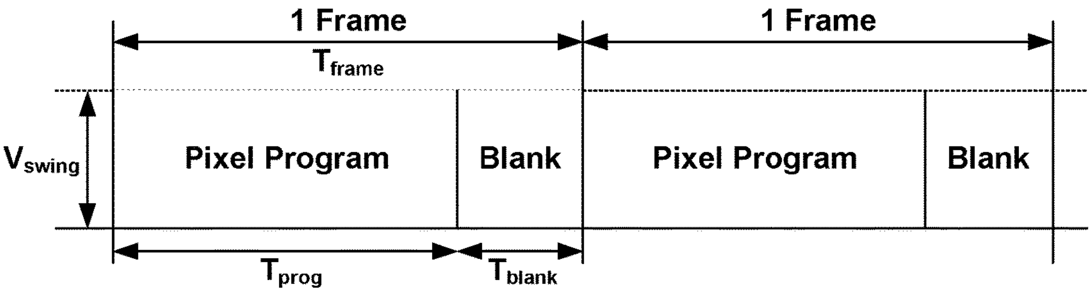

FIGS. 4A and 4B are conceptual diagrams illustrating analog data power, in accordance with one or more aspects of this disclosure. FIG. 4A illustrates an example arrangement of subpixels in rows and columns. In particular, FIG. 4A illustrates a so-called RGBG arrangement in which each pixel is made up of one red sub-pixel, two green sub-pixels, and one blue sub-pixel. The blue and red sub-pixels are arranged on common columns (e.g., odd numbered columns), while the green sub-pixels are arranged on their own columns (e.g., even numbered columns). Due to various properties of the sub-pixels, the voltages needed to achieve certain gray codes may be different for different colors. For instance, the voltage needed to achieve blue gray code 255 may be different than (e.g., greater) the voltage needed to achieve red gray code 255. When programming sub-pixel output levels, the amount of power consumed may be a function of the differences between voltages of adjacent pixels. The difference in voltage of one sub-pixel to the next sub-pixel may be referred to as the swing voltage or $V_{Swing}$. The worst-case scenario (greatest power usage) may be where all red sub-pixels are off (e.g. have gray code of 0) and all blue sub-pixels are fully on (e.g., have a gray code of 255). As a result of this, the analog data amount of power (e.g., $P_{Data}$) may be based on the content displayed.

FIG. 4B illustrates an example timing diagram of pixel programming. As shown in FIG. 4B, outputting a frame of data may include a pixel programming period and an optional blanking period. During the pixel programming period, driver IC 22 may output voltage levels that cause various sub-pixels to emit light at certain levels.

Based on the above, data power calculator 34 may use the following theoretical equation to calculate the data line power:

$$\text{Data Line Power} = C_{line} * V_{swing}^2 * F_{toggle} * \frac{T_{prog}}{T_{frame}}$$

Where $C_{line}$ is the capacitance of a line of sub-pixels (e.g., $C_{LINE}$ of FIG. 4A), $V_{swing}$ is the swing voltage between adjacent sub-pixels, $F_{toggle}$ is the frame rate, $T_{prog}$ is the length of the programming period, and $T_{frame}$ is the length of the whole frame (E.g., $T_{prog}$ plus $T_{blank}$).

Based on this theoretical equation, data power calculator 34 may use the following analytical equation to calculate $P_{Data}$:

$$P_{data} = C_{LINE} * AVDD * FR * \sum_{i=1}^{N}\sum_{j=1}^{M} relu[V_{i,j+1} - V_{i,j}]$$

Where $C_{line}$ is the capacitance of a line of sub-pixels (e.g., $C_{LINE}$ of FIG. 4A), AVDD is the voltage level of the AVDD rail (e.g., produced by a power converter of power converters 20 of FIG. 1), $V_{i,j}$ is the voltage needed to program the sub-pixel at location i,j, and relu[ ] is the rectified linear unit function (e.g., as swinging from a higher programming voltage to a lower programming voltage does not consume power whereas swinging from a low programming voltage to a high programming voltage does consume power).

For completeness, it is again noted that the programming voltage of a sub-pixel is a function of both the gray code of the sub-pixel and the display brightness value. As such, data power calculator 34 may determine $P_{Data}$ based on one or more of: content to be displayed, display brightness value, frame rate, and dataline capacitance.

Figure 5:
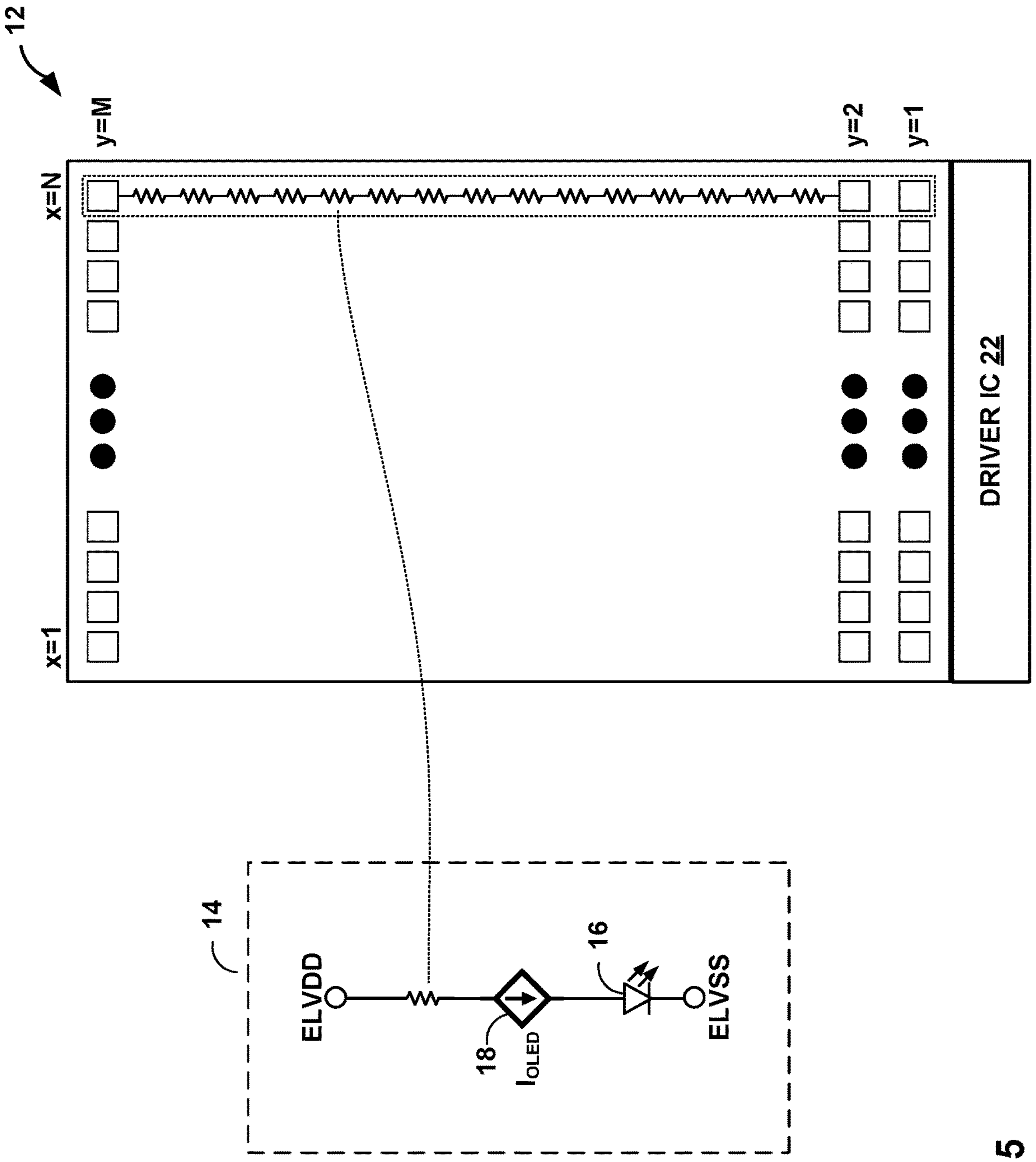
FIG. 5 is a conceptual diagram illustrating components of a display, in accordance with one or more aspects of this disclosure.

FIG. 5 is a conceptual diagram illustrating components of a display, in accordance with one or more aspects of this disclosure. As discussed above, panel load resistance may have an impact on the amount of current used to drive light emitting elements (e.g., have an impact on $I_{OLED}$). The panel load resistance, also referred to as internal resistance (IR), may be formed of the collective resistances of components internal to display 12. For instance, as shown in FIG. 5, each additional row of pixels may introduce an additional resistance. The accumulated resistance may be relatively small close to driver IC 22 (e.g., in rows near the "bottom" such as y=1) but may be relatively large far away from driver IC 22 (e.g., in rows near the "top" such as y=M). The result of these changes in IR may cause the amount of current used to drive light emitting elements to be a function of the distance away (e.g., number of rows, or y coordinate in FIG. 5) from driver IC 22. For instance, $I_{OLED}$ may be a function of display brightness value (DBV), red gray code R, green gray code G, blue gray code B, and position y (e.g., $I_{OLED}$~$f$(DBV,R,G,B,y)). In some example, y may represent the distance (e.g., in number of pixels) that the particular row is away from driver IC 22.

This dependence on position y may cause the above-described analytical equations for emission power to not hold true. In accordance with one or more techniques of this disclosure, EM power calculator 32 may use a machine learning model to predict the emission power of display 12. For instance, EM power calculator 32 may use a machine learning model may be trained based on prior emission power consumption of display 12 while displaying various patterns at various locations to predict $I_{OLED}$. As such, the machine learning model may account of for the panel load resistance.

Figure 6:
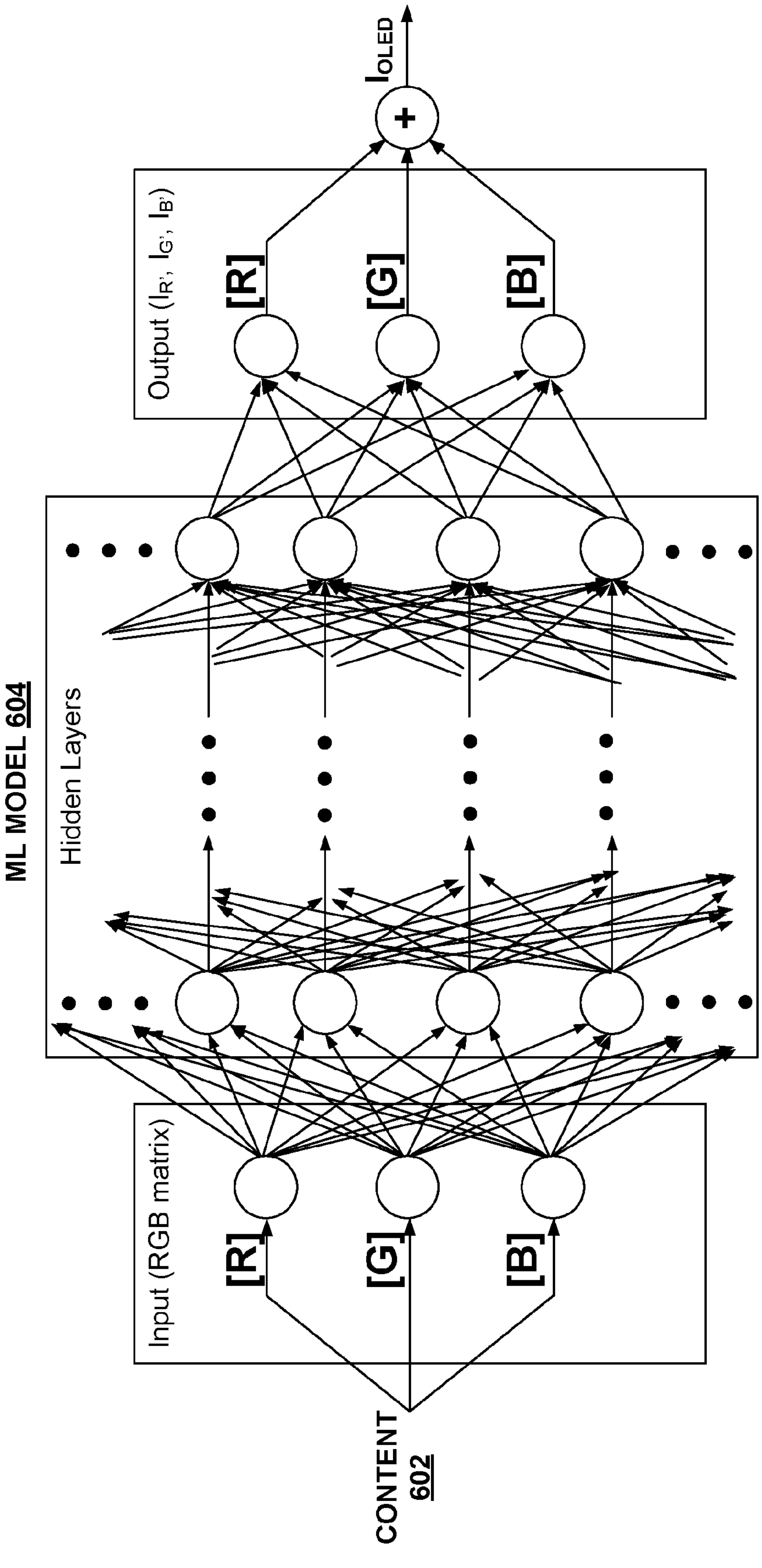
FIG. 6 is a conceptual diagram illustrating a machine learning model that predicts emission power of a display, in accordance with one or more aspects of this disclosure.

FIG. 6 is a conceptual diagram illustrating a machine learning model that predicts emission power of a display, in accordance with one or more aspects of this disclosure. As discussed above, EM power calculator 32 may use a machine learning model to predict the emission power of display 12. In some examples, the machine learning model may be a deep neural network, such as a convolutional neural network (CNN), to predict the emission power. Using a CNN to predict the emission power may present one or more advantages. For instance, CNNs may preserve location information (e.g., the row information or "y" from FIG. 5).

As shown in FIG. 6, EM power calculator 32 may receive content 602, which is content to be displayed at display 12 at a future time. Content 602 may be in the form of an RGB matrix, referred to as an input RGB matrix. EM power calculator 32 may executed ML model 604 to process content 602 to determine a predicted amount of emission power. For instance, EM power calculator 32 may determine, using ML model 604 and based on content 602, $I_{OLED}$.

EM power calculator 32 may determine the total emission power based on the determined $I_{OLED}$. For instance, EM power calculator 32 may determine the emission power using the below analytical equation.

$$P_{EM} = [ELVDD - ELVSS] \cdot \sum_{i-1}^{N} \sum_{j-1}^{M} I_{OLED}[i, j]$$

where $I_{OLED}[i,j] \sim f(DBV,R,G,B, y)$.

Referring back to FIG. 3, power selector 38 may be configured to select a power converter of power converters 20 based on one or more of the estimated power levels. For instance, power selector 38 may estimate a total amount of power to be used by display 12 based on one or more of the estimated emission amount of power $P_{EM}$, the estimated a data amount of power $P_{Data}$, and/or the estimated gate driving amount of power $P_{GIP}$. The total amount of power may be expressed as a current level (e.g., assuming consistent voltages) or as a watt level.

In some example, power selector 38 may include a look-up table (LUT) that maps between current levels and power converters. An example LUT is shown below in Table 1.

TABLE 1

| Current Range | Power Converter |
|---|---|
| 10 mA-50 mA | Power converter 20A |
| 51 mA-250 mA | Power converter 20B |

As shown above in Table 1, if the estimated power level is between 10 mA and 50 mA, power selector 38 may select power converter 20A. Similarly, if the estimated power level is between 51 mA and 250 mA, power selector 38 may select power converter 20B.

In some examples, power selector 38 may select a set of power converters from power converters 20. For instance, where power converters 20 includes a first set of power converters configured to supply a first power rail (e.g., a set of EVLDD and EVLSS converters) and a second set of power converters configured to supply a second power rail (e.g., a set of AVDD converters), power selector 38 may select a power converter from the first set and a power converter from the second set. As one example, power selector 38 may select, based on the emission power, an ELVDD/ELVSS converter from a set of ELVDD/ELVSS converters and select, based on the gate driving amount of power and the data amount of power, an AVDD converter from a set of AVDD converters. The selection of power converters may be separate or may be joint. For instance, in joint selection, power selector 38 may always select the same AVDD converter for a particular ELVDD/ELVSS converter. In separate selection, power selector 38 may select the AVDD converter that is optimized to output $P_{Data}+P_{GIP}$ and select the ELVDD/ELVSS that is optimized to output $P_{EM}$.

Power selector 38 may cause electrical power from the selected power converter to be supplied to the display at the future time. As one example, as shown in the example of FIG. 3, power selector 38 may cause the selected power converter of power converters 20 to supply electrical power to display 12 while causing the other power converters of power converters 20 to not supply electrical power to display 12. As another example, as shown in the example of FIG. 1, power selector 38 may output a signal to multiplexer 8 that causes power from the selected power converter of power converters 20 to be routed to display 12 (while similarly not operating the other power converters of power converters 20).

Controller 10 may be configured to periodically update the selection of a power converter from power converters 20. For instance, controller 10 may be configured to update the selection of the power converter from power converters 20 based on an occurrence of an event. Example events include, but are not limited to, display 12 displaying a particular quantity of frames (e.g., 1, 5, 10, 20, 30, 60, 120, etc.), passage of a particular amount of time (e.g., 1 second, 2 seconds, 5 seconds, 10 seconds, 30 seconds, 1 minute, etc.), and the like. As one example, controller 10 may determine that the event has occurred responsive to determining that a particular quantity of frames has been displayed by display 12 (e.g., based on monitoring of a framebuffer of, or used by, display 12). As another example, controller 10 may determine that the event has occurred responsive to determining that a particular amount of time has passed.

FIGS. 7A through 7E are conceptual diagrams illustrating aspects of an example machine-learned model according to example implementations of the present disclosure. FIGS. 7A through 7E are described below in the context of models 604 of FIG. 6. For example, in some instances, machine-learned model 300, as referenced below, may be an example of any of model 604.

Figure 7A:
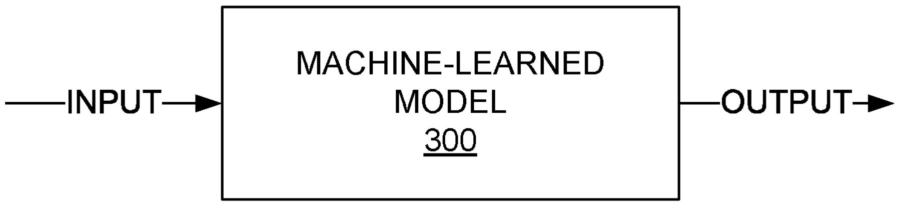
FIGS. 7A through 7E are conceptual diagrams illustrating aspects of an example machine-learned model according to example implementations of the present disclosure.

FIG. 7A depicts a conceptual diagram of an example machine-learned model according to example implementations of the present disclosure. As illustrated in FIG. 7A, in some implementations, machine-learned model 300 is trained to receive input data of one or more types and, in response, provide output data of one or more types. Thus, FIG. 7A illustrates machine-learned model 300 performing inference.

The input data may include one or more features that are associated with an instance or an example. In some implementations, the one or more features associated with the instance or example can be organized into a feature vector (e.g., an RGB matrix). In some implementations, the output data can include one or more predictions. Predictions can also be referred to as inferences. Thus, given features associated with a particular instance, machine-learned model 300 can output a prediction for such instance based on the features.

Machine-learned model 300 can be or include one or more of various different types of machine-learned models. In particular, in some implementations, machine-learned model 300 can perform classification, regression, clustering, anomaly detection, recommendation generation, and/or other tasks.

In some implementations, machine-learned model 300 can perform various types of classification based on the input data. For example, machine-learned model 300 can perform binary classification or multiclass classification. In binary classification, the output data can include a classification of the input data into one of two different classes. In multiclass classification, the output data can include a classification of the input data into one (or more) of more than two classes. The classifications can be single label or multi-label. Machine-learned model 300 may perform discrete categorical classification in which the input data is simply classified into one or more classes or categories.

In some implementations, machine-learned model 300 can perform classification in which machine-learned model 300 provides, for each of one or more classes, a numerical value descriptive of a degree to which it is believed that the input data should be classified into the corresponding class. In some instances, the numerical values provided by machine-learned model 300 can be referred to as "confidence scores" that are indicative of a respective confidence associated with classification of the input into the respective class. In some implementations, the confidence scores can be compared to one or more thresholds to render a discrete categorical prediction. In some implementations, only a certain number of classes (e.g., one) with the relatively largest confidence scores can be selected to render a discrete categorical prediction.

Machine-learned model 300 may output a probabilistic classification. For example, machine-learned model 300 may predict, given a sample input, a probability distribution over a set of classes. Thus, rather than outputting only the most likely class to which the sample input should belong, machine-learned model 300 can output, for each class, a probability that the sample input belongs to such class. In some implementations, the probability distribution over all possible classes can sum to one. In some implementations, a Softmax function, or other type of function or layer can be used to squash a set of real values respectively associated with the possible classes to a set of real values in the range (0, 1) that sum to one.

In some examples, the probabilities provided by the probability distribution can be compared to one or more thresholds to render a discrete categorical prediction. In some implementations, only a certain number of classes (e.g., one) with the relatively largest predicted probability can be selected to render a discrete categorical prediction.

In cases in which machine-learned model 300 performs classification, machine-learned model 300 may be trained using supervised learning techniques. For example, machine-learned model 300 may be trained on a training dataset that includes training examples labeled as belonging (or not belonging) to one or more classes. Further details regarding supervised training techniques are provided below in the descriptions of FIGS. 7B through 7E.

In some implementations, machine-learned model 300 can perform regression to provide output data in the form of a continuous numeric value. The continuous numeric value can correspond to any number of different metrics or numeric representations, including, for example, currency values, scores, or other numeric representations. As examples, machine-learned model 300 can perform linear regression, polynomial regression, or nonlinear regression. As examples, machine-learned model 300 can perform simple regression or multiple regression. As described above, in some implementations, a Softmax function or other function or layer can be used to squash a set of real values respectively associated with a two or more possible classes to a set of real values in the range (0, 1) that sum to one.

Machine-learned model 300 may perform various types of clustering. For example, machine-learned model 300 can identify one or more previously-defined clusters to which the input data most likely corresponds. Machine-learned model 300 may identify one or more clusters within the input data. That is, in instances in which the input data includes multiple objects, documents, or other entities, machine-learned model 300 can sort the multiple entities included in the input data into a number of clusters. In some implementations in which machine-learned model 300 performs clustering, machine-learned model 300 can be trained using unsupervised learning techniques.

Machine-learned model 300 may perform anomaly detection or outlier detection. For example, machine-learned model 300 can identify input data that does not conform to an expected pattern or other characteristic (e.g., as previously observed from previous input data). As examples, the anomaly detection can be used for fraud detection or system failure detection.

In some implementations, machine-learned model 300 can provide output data in the form of one or more recommendations. For example, machine-learned model 300 can be included in a recommendation system or engine. As an example, given input data that describes previous outcomes for certain entities (e.g., a score, ranking, or rating indicative of an amount of success or enjoyment), machine-learned model 300 can output a suggestion or recommendation of one or more additional entities that, based on the previous outcomes, are expected to have a desired outcome (e.g., elicit a score, ranking, or rating indicative of success or enjoyment). As one example, given input data descriptive of content to be output at a display of a computing device, such as device 2 of FIG. 1, a controller, such as controller 10 of FIG. 1, can predict an amount of power that will be used to output the content.

Machine-learned model 300 may, in some cases, act as an agent within an environment. For example, machine-learned model 300 can be trained using reinforcement learning, which will be discussed in further detail below.

In some implementations, machine-learned model 300 can be a parametric model while, in other implementations, machine-learned model 300 can be a non-parametric model. In some implementations, machine-learned model 300 can be a linear model while, in other implementations, machine-learned model 300 can be a non-linear model.

As described above, machine-learned model 300 can be or include one or more of various different types of machine-learned models. Examples of such different types of machine-learned models are provided below for illustration. One or more of the example models described below can be used (e.g., combined) to provide the output data in response to the input data. Additional models beyond the example models provided below can be used as well.

In some implementations, machine-learned model 300 can be or include one or more classifier models such as, for example, linear classification models; quadratic classification models; etc. Machine-learned model 300 may be or include one or more regression models such as, for example, simple linear regression models; multiple linear regression models; logistic regression models; stepwise regression models; multivariate adaptive regression splines; locally estimated scatterplot smoothing models; etc.

In some examples, machine-learned model 300 can be or include one or more decision tree-based models such as, for example, classification and/or regression trees; iterative dichotomiser 3 decision trees; C4.5 decision trees; chi-squared automatic interaction detection decision trees; decision stumps; conditional decision trees; etc.

Machine-learned model 300 may be or include one or more kernel machines. In some implementations, machine-learned model 300 can be or include one or more support vector machines. Machine-learned model 300 may be or include one or more instance-based learning models such as, for example, learning vector quantization models; selforganizing map models; locally weighted learning models; etc. In some implementations, machine-learned model 300 can be or include one or more nearest neighbor models such as, for example, k-nearest neighbor classifications models; k-nearest neighbors regression models; etc. Machine-learned model 300 can be or include one or more Bayesian models such as, for example, naïve Bayes models; Gaussian naïve Bayes models; multinomial naïve Bayes models; averaged one-dependence estimators; Bayesian networks; Bayesian belief networks; hidden Markov models; etc.

In some implementations, machine-learned model 300 can be or include one or more artificial neural networks (also referred to simply as neural networks). A neural network can include a group of connected nodes, which also can be referred to as neurons or perceptrons. A neural network can be organized into one or more layers. Neural networks that include multiple layers can be referred to as "deep" networks. A deep network can include an input layer, an output layer, and one or more hidden layers positioned between the input layer and the output layer (e.g., as shown in FIG. 6). The nodes of the neural network can be connected or non-fully connected.

Machine-learned model 300 can be or include one or more feed forward neural networks. In feed forward networks, the connections between nodes do not form a cycle. For example, each connection can connect a node from an earlier layer to a node from a later layer.

In some instances, machine-learned model 300 can be or include one or more recurrent neural networks. In some instances, at least some of the nodes of a recurrent neural network can form a cycle. Recurrent neural networks can be especially useful for processing input data that is sequential in nature. In particular, in some instances, a recurrent neural network can pass or retain information from a previous portion of the input data sequence to a subsequent portion of the input data sequence through the use of recurrent or directed cyclical node connections.

In some examples, sequential input data can include time-series data (e.g., sensor data versus time or imagery captured at different times). For example, a recurrent neural network can analyze sensor data versus time to detect or predict a swipe direction, to perform handwriting recognition, etc. Sequential input data may include words in a sentence (e.g., for natural language processing, speech detection or processing, etc.); notes in a musical composition; sequential actions taken by a user (e.g., to detect or predict sequential application usage); sequential object states; etc.

Example recurrent neural networks include long short-term (LSTM) recurrent neural networks; gated recurrent units; bi-direction recurrent neural networks; continuous time recurrent neural networks; neural history compressors; echo state networks; Elman networks; Jordan networks; recursive neural networks; Hopfield networks; fully recurrent networks; sequence-to-sequence configurations; etc.

In some implementations, machine-learned model 300 can be or include one or more convolutional neural networks. In some instances, a convolutional neural network can include one or more convolutional layers that perform convolutions over input data using learned filters.

Filters can also be referred to as kernels. Convolutional neural networks can be especially useful for vision problems such as when the input data includes imagery such as still images or video. However, convolutional neural networks can also be applied for natural language processing.

In some examples, machine-learned model 300 can be or include one or more generative networks such as, for example, generative adversarial networks. Generative networks can be used to generate new data such as new images or other content.

Machine-learned model 300 may be or include an autoencoder. In some instances, the aim of an autoencoder is to learn a representation (e.g., a lower-dimensional encoding) for a set of data, typically for the purpose of dimensionality reduction. For example, in some instances, an autoencoder can seek to encode the input data and the provide output data that reconstructs the input data from the encoding. Recently, the autoencoder concept has become more widely used for learning generative models of data. In some instances, the autoencoder can include additional losses beyond reconstructing the input data.

Machine-learned model 300 may be or include one or more other forms of artificial neural networks such as, for example, deep Boltzmann machines; deep belief networks; stacked autoencoders; etc. Any of the neural networks described herein can be combined (e.g., stacked) to form more complex networks.

One or more neural networks can be used to provide an embedding based on the input data. For example, the embedding can be a representation of knowledge abstracted from the input data into one or more learned dimensions. In some instances, embeddings can be a useful source for identifying related entities. In some instances, embeddings can be extracted from the output of the network, while in other instances embeddings can be extracted from any hidden node or layer of the network (e.g., a close to final but not final layer of the network). Embeddings can be useful for performing auto suggest next video, product suggestion, entity or object recognition, etc. In some instances, embeddings be useful inputs for downstream models. For example, embeddings can be useful to generalize input data (e.g., search queries) for a downstream model or processing system.

Machine-learned model 300 may include one or more clustering models such as, for example, k-means clustering models; k-medians clustering models; expectation maximization models; hierarchical clustering models; etc.

In some implementations, machine-learned model 300 can perform one or more dimensionality reduction techniques such as, for example, principal component analysis; kernel principal component analysis; graph-based kernel principal component analysis; principal component regression; partial least squares regression; Sammon mapping; multidimensional scaling; projection pursuit; linear discriminant analysis; mixture discriminant analysis; quadratic discriminant analysis; generalized discriminant analysis; flexible discriminant analysis; autoencoding; etc.

In some implementations, machine-learned model 300 can perform or be subjected to one or more reinforcement learning techniques such as Markov decision processes; dynamic programming; Q functions or Q-learning; value function approaches; deep Q-networks; differentiable neural computers; asynchronous advantage actor-critics; deterministic policy gradient; etc.

In some implementations, machine-learned model 300 can be an autoregressive model. In some instances, an autoregressive model can specify that the output data depends linearly on its own previous values and on a stochastic term. In some instances, an autoregressive model can take the form of a stochastic difference equation. One example autoregressive model is WaveNet, which is a generative model for raw audio.

In some implementations, machine-learned model 300 can include or form part of a multiple model ensemble. As one example, bootstrap aggregating can be performed, which can also be referred to as "bagging." In bootstrap aggregating, a training dataset is split into a number of subsets (e.g., through random sampling with replacement) and a plurality of models are respectively trained on the number of subsets. At inference time, respective outputs of the plurality of models can be combined (e.g., through averaging, voting, or other techniques) and used as the output of the ensemble.

One example ensemble is a random forest, which can also be referred to as a random decision forest. Random forests are an ensemble learning method for classification, regression, and other tasks. Random forests are generated by producing a plurality of decision trees at training time. In some instances, at inference time, the class that is the mode of the classes (classification) or the mean prediction (regression) of the individual trees can be used as the output of the forest. Random decision forests can correct for decision trees' tendency to overfit their training set.

Another example ensemble technique is stacking, which can, in some instances, be referred to as stacked generalization. Stacking includes training a combiner model to blend or otherwise combine the predictions of several other machine-learned models. Thus, a plurality of machine-learned models (e.g., of same or different type) can be trained based on training data. In addition, a combiner model can be trained to take the predictions from the other machine-learned models as inputs and, in response, produce a final inference or prediction. In some instances, a single-layer logistic regression model can be used as the combiner model.

Another example ensemble technique is boosting. Boosting can include incrementally building an ensemble by iteratively training weak models and then adding to a final strong model. For example, in some instances, each new model can be trained to emphasize the training examples that previous models misinterpreted (e.g., misclassified). For example, a weight associated with each of such misinterpreted examples can be increased. One common implementation of boosting is AdaBoost, which can also be referred to as Adaptive Boosting. Other example boosting techniques include LPBoost; TotalBoost; BrownBoost; xgboost; MadaBoost, LogitBoost, gradient boosting; etc. Furthermore, any of the models described above (e.g., regression models and artificial neural networks) can be combined to form an ensemble. As an example, an ensemble can include a top level machine-learned model or a heuristic function to combine and/or weight the outputs of the models that form the ensemble.

In some implementations, multiple machine-learned models (e.g., that form an ensemble can be linked and trained jointly (e.g., through backpropagation of errors sequentially through the model ensemble). However, in some implementations, only a subset (e.g., one) of the jointly trained models is used for inference.

In some implementations, machine-learned model 300 can be used to preprocess the input data for subsequent input into another model. For example, machine-learned model 300 can perform dimensionality reduction techniques and embeddings (e.g., matrix factorization, principal components analysis, singular value decomposition, word2vec/GLOVE, and/or related approaches); clustering; and even classification and regression for downstream consumption. Many of these techniques have been discussed above and will be further discussed below.

As discussed above, machine-learned model 300 can be trained or otherwise configured to receive the input data and, in response, provide the output data. The input data can include different types, forms, or variations of input data. As examples, in various implementations, the input data can include features that describe the content (or portion of content) initially selected by the user, e.g., content of user-selected document or image, links pointing to the user selection, links within the user selection relating to other files available on device or cloud, metadata of user selection, etc. Additionally, with user permission, the input data includes the context of user usage, either obtained from app itself or from other sources. Examples of usage context include breadth of share (sharing publicly, or with a large group, or privately, or a specific person), context of share, etc. When permitted by the user, additional input data can include the state of the device, e.g., the location of the device, the apps running on the device, etc.

In some implementations, machine-learned model 300 can receive and use the input data in its raw form. In some implementations, the raw input data can be preprocessed. Thus, in addition or alternatively to the raw input data, machine-learned model 300 can receive and use the preprocessed input data.

In some implementations, preprocessing the input data can include extracting one or more additional features from the raw input data. For example, feature extraction techniques can be applied to the input data to generate one or more new, additional features. Example feature extraction techniques include edge detection; corner detection; blob detection; ridge detection; scale-invariant feature transform; motion detection; optical flow; Hough transform; etc.

In some implementations, the extracted features can include or be derived from transformations of the input data into other domains and/or dimensions. As an example, the extracted features can include or be derived from transformations of the input data into the frequency domain. For example, wavelet transformations and/or fast Fourier transforms can be performed on the input data to generate additional features.

In some implementations, the extracted features can include statistics calculated from the input data or certain portions or dimensions of the input data. Example statistics include the mode, mean, maximum, minimum, or other metrics of the input data or portions thereof.

In some implementations, as described above, the input data can be sequential in nature. In some instances, the sequential input data can be generated by sampling or otherwise segmenting a stream of input data. As one example, frames can be extracted from a video. In some implementations, sequential data can be made non-sequential through summarization.

As another example preprocessing technique, portions of the input data can be imputed. For example, additional synthetic input data can be generated through interpolation and/or extrapolation.

As another example preprocessing technique, some or all of the input data can be scaled, standardized, normalized, generalized, and/or regularized. Example regularization techniques include ridge regression; least absolute shrinkage and selection operator (LASSO); elastic net; least-angle regression; cross-validation; L1 regularization; L2 regularization; etc. As one example, some or all of the input data can be normalized by subtracting the mean across a given dimension's feature values from each individual feature value and then dividing by the standard deviation or other metric.

As another example preprocessing technique, some or all or the input data can be quantized or discretized. In some cases, qualitative features or variables included in the input data can be converted to quantitative features or variables. For example, one hot encoding can be performed.

In some examples, dimensionality reduction techniques can be applied to the input data prior to input into machine-learned model 300. Several examples of dimensionality reduction techniques are provided above, including, for example, principal component analysis; kernel principal component analysis; graph-based kernel principal component analysis; principal component regression; partial least squares regression; Sammon mapping; multidimensional scaling; projection pursuit; linear discriminant analysis; mixture discriminant analysis; quadratic discriminant analysis; generalized discriminant analysis; flexible discriminant analysis; autoencoding; etc.

In some implementations, during training, the input data can be intentionally deformed in any number of ways to increase model robustness, generalization, or other qualities. Example techniques to deform the input data include adding noise; changing color, shade, or hue; magnification; segmentation; amplification; etc.

In response to receipt of the input data, machine-learned model 300 can provide the output data. The output data can include different types, forms, or variations of output data. As examples, in various implementations, the output data can include content, either stored locally on the user device or in the cloud, that is relevantly shareable along with the initial content selection.

As discussed above, in some implementations, the output data can include various types of classification data (e.g., binary classification, multiclass classification, single label, multi-label, discrete classification, regressive classification, probabilistic classification, etc.) or can include various types of regressive data (e.g., linear regression, polynomial regression, nonlinear regression, simple regression, multiple regression, etc.). In other instances, the output data can include clustering data, anomaly detection data, recommendation data, or any of the other forms of output data discussed above.

In some implementations, the output data can influence downstream processes or decision making. As one example, in some implementations, the output data can be interpreted and/or acted upon by a rules-based regulator.

The present disclosure provides systems and methods that include or otherwise leverage one or more machine-learned models to suggest content, either stored locally on the uses device or in the cloud, that is relevantly shareable along with the initial content selection based on features of the initial content selection. Any of the different types or forms of input data described above can be combined with any of the different types or forms of machine-learned models described above to provide any of the different types or forms of output data described above.

The systems and methods of the present disclosure can be implemented by or otherwise executed on one or more computing devices. Example computing devices include user computing devices (e.g., laptops, desktops, and mobile computing devices such as tablets, smartphones, wearable computing devices, etc.); embedded computing devices (e.g., devices embedded within a vehicle, camera, image sensor, industrial machine, satellite, gaming console or controller, or home appliance such as a refrigerator, thermostat, energy meter, home energy manager, smart home assistant, etc.); server computing devices (e.g., database servers, parameter servers, file servers, mail servers, print servers, web servers, game servers, application servers, etc.); dedicated, specialized model processing or training devices; virtual computing devices; other computing devices or computing infrastructure; or combinations thereof.

Figure 7B:
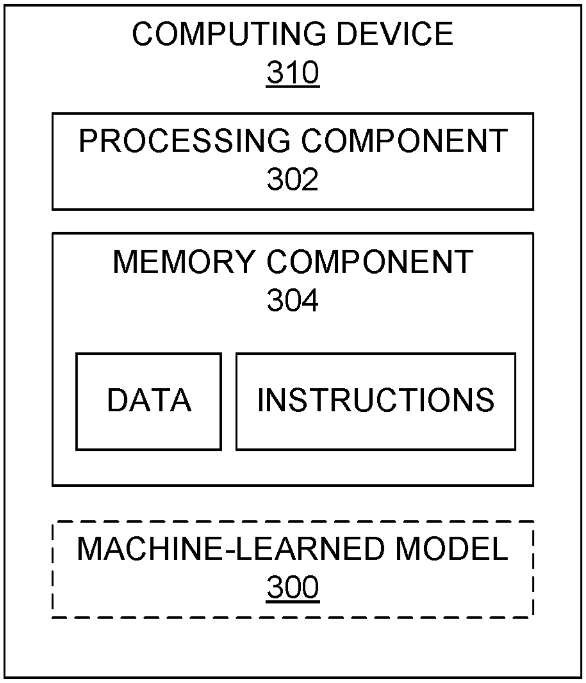

FIG. 7B illustrates a conceptual diagram of computing device 310, which is an example of device 2 of FIG. 1. Computing device 310 includes processing component 302, memory component 304 and machine-learned model 300. Computing device 310 may store and implement machine-learned model 300 locally (i.e., on-device). Thus, in some implementations, machine-learned model 300 can be stored at and/or implemented locally by an embedded device or a user computing device such as a mobile device. Output data obtained through local implementation of machine-learned model 300 at the embedded device or the user computing device can be used to improve performance of the embedded device or the user computing device (e.g., an application implemented by the embedded device or the user computing device).

Figure 7C:
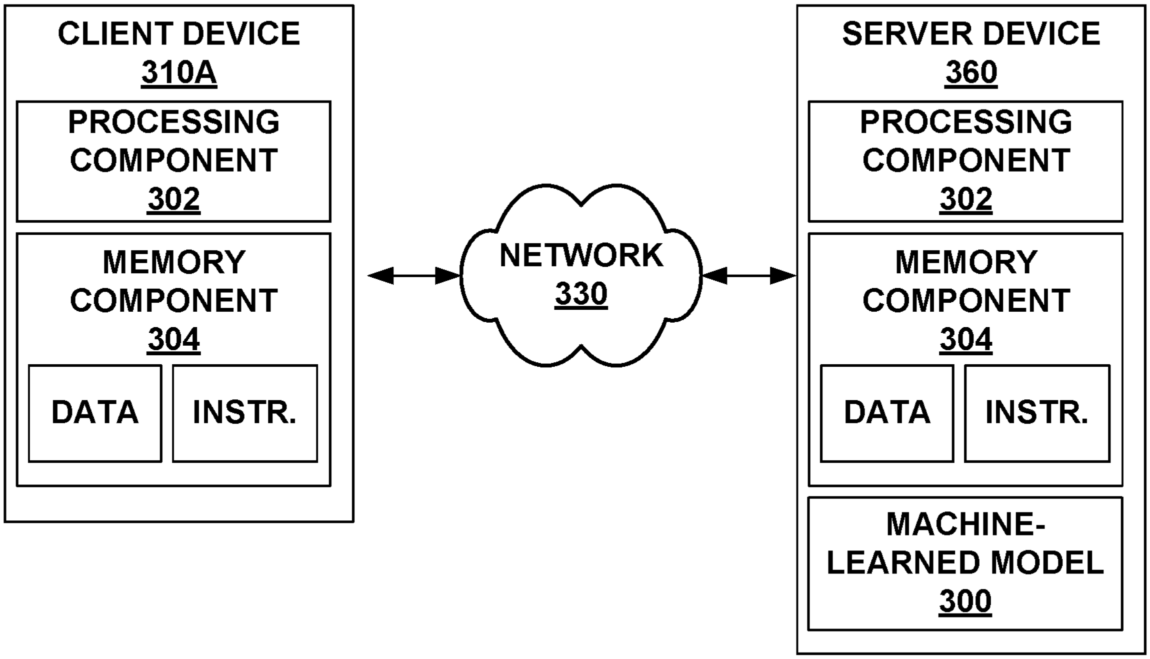

FIG. 7C illustrates a conceptual diagram of an example client computing device that can communicate over a network with an example server computing system that includes a machine-learned model. FIG. 7C includes client device 310A communicating with server device 360 over network 330. Client device 310A is an example of device 2 of FIG. 1. Server device 360 stores and implements machine-learned model 300. In some instances, output data obtained through machine-learned model 300 at server device 360 can be used to improve other server tasks or can be used by other non-user devices to improve services performed by or for such other non-user devices. For example, the output data can improve other downstream processes performed by server device 360 for a computing device of a user or embedded computing device. In other instances, output data obtained through implementation of machine-learned model 300 at server device 360 can be sent to and used by a user computing device, an embedded computing device, or some other client device, such as client device 310A. For example, server device 360 can be said to perform machine learning as a service.

In yet other implementations, different respective portions of machine-learned model 300 can be stored at and/or implemented by some combination of a user computing device; an embedded computing device; a server computing device; etc. In other words, portions of machine-learned model 300 may be distributed in whole or in part amongst client device 310A and server device 360.

Devices 310A and 360 may perform graph processing techniques or other machine learning techniques using one or more machine learning platforms, frameworks, and/or libraries, such as, for example, TensorFlow, Caffe/Caffe2, Theano, Torch/PyTorch, MXnet, CNTK, etc. Devices 310A and 360 may be distributed at different physical locations and connected via one or more networks, including network 330. If configured as distributed computing devices, Devices 310A and 360 may operate according to sequential computing architectures, parallel computing architectures, or combinations thereof. In one example, distributed computing devices can be controlled or guided through use of a parameter server.

In some implementations, multiple instances of machine-learned model 300 can be parallelized to provide increased processing throughput. For example, the multiple instances of machine-learned model 300 can be parallelized on a single processing device or computing device or parallelized across multiple processing devices or computing devices.

Each computing device that implements machine-learned model 300 or other aspects of the present disclosure can include a number of hardware components that enable performance of the techniques described herein. For example, each computing device can include one or more memory devices that store some or all of machine-learned model 300. For example, machine-learned model 300 can be a structured numerical representation that is stored in memory. The one or more memory devices can also include instructions for implementing machine-learned model 300 or performing other operations. Example memory devices include RAM, ROM, EEPROM, EPROM, flash memory devices, magnetic disks, etc., and combinations thereof.

Each computing device can also include one or more processing devices that implement some or all of machine-learned model 300 and/or perform other related operations. Example processing devices include one or more of: a central processing unit (CPU); a visual processing unit (VPU); a graphics processing unit (GPU); a tensor processing unit (TPU); a neural processing unit (NPU); a neural processing engine; a core of a CPU, VPU, GPU, TPU, NPU or other processing device; an application specific integrated circuit (ASIC); a field programmable gate array (FPGA); a co-processor; a controller; or combinations of the processing devices described above. Processing devices can be embedded within other hardware components such as, for example, an image sensor, accelerometer, etc.

Hardware components (e.g., memory devices and/or processing devices) can be spread across multiple physically distributed computing devices and/or virtually distributed computing systems.

Figure 7D:
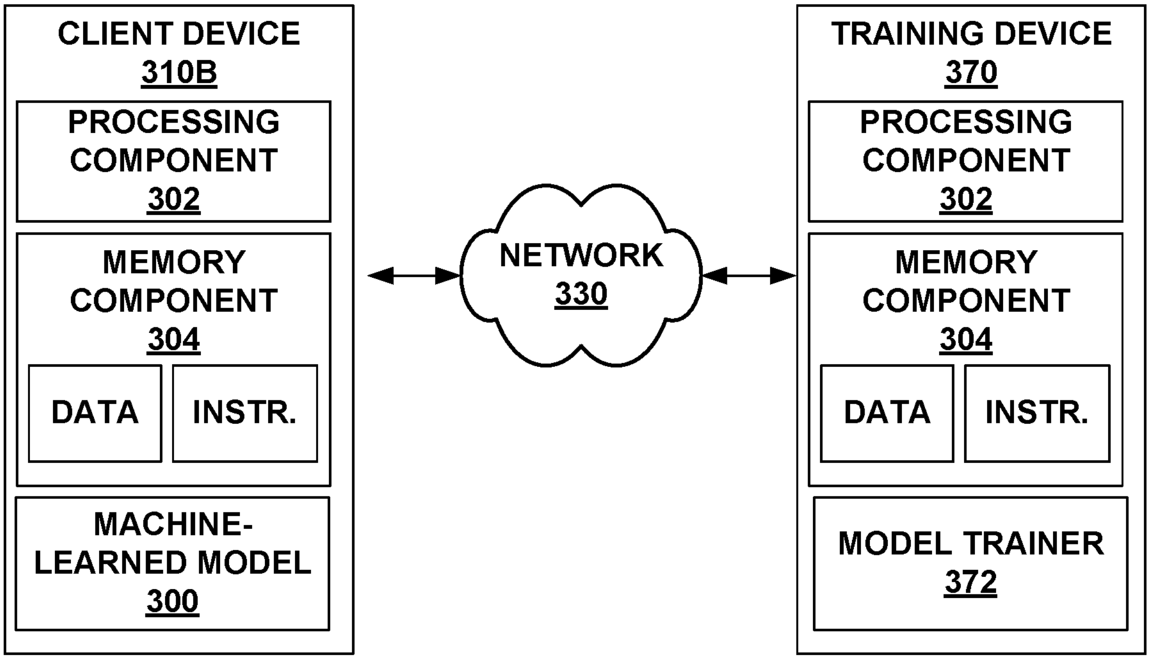

FIG. 7D illustrates a conceptual diagram of an example computing device in communication with an example training computing system that includes a model trainer. FIG. 7D includes client device 310B communicating with training device 370 over network 330. Client device 310B is an example of device 2 of FIG. 1. Machine-learned model 300 described herein can be trained at a training computing system, such as training device 370, and then provided for storage and/or implementation at one or more computing devices, such as client device 310B. For example, model trainer 372 executes locally at training device 370. However, in some examples, training device 370, including model trainer 372, can be included in or separate from client device 310B or any other computing device that implement machine-learned model 300.

In some implementations, machine-learned model 300 may be trained in an offline fashion or an online fashion. In offline training (also known as batch learning), machine-learned model 300 is trained on the entirety of a static set of training data. In online learning, machine-learned model 300 is continuously trained (or re-trained) as new training data becomes available (e.g., while the model is used to perform inference).

Model trainer 372 may perform centralized training of machine-learned model 300 (e.g., based on a centrally stored dataset). In other implementations, decentralized training techniques such as distributed training, federated learning, or the like can be used to train, update, or personalize machine-learned model 300.

Machine-learned model 300 described herein can be trained according to one or more of various different training types or techniques. For example, in some implementations, machine-learned model 300 can be trained by model trainer 372 using supervised learning, in which machine-learned model 300 is trained on a training dataset that includes instances or examples that have labels. The labels can be manually applied by experts, generated through crowd-sourcing, or provided by other techniques (e.g., by physics-based or complex mathematical models). In some implementations, if the user has provided consent, the training examples can be provided by the user computing device. In some implementations, this process can be referred to as personalizing the model.

Figure 7E:
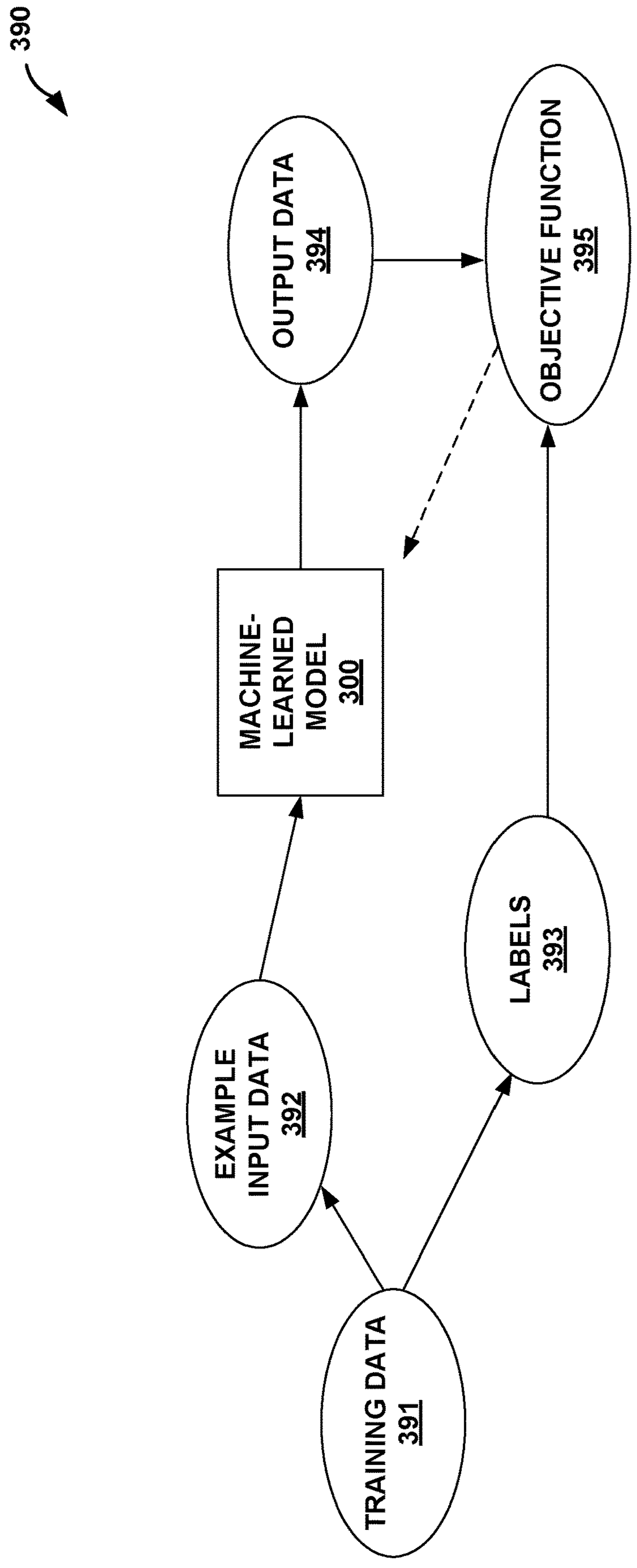

FIG. 7E illustrates a conceptual diagram of training process 390 which is an example training process in which machine-learned model 300 is trained on training data 391 that includes example input data 392 that has labels 393. Training processes 390 is one example training process; other training processes may be used as well.

Training data 391 used by training process 390 can include, upon user permission for use of such data for training, anonymized usage logs of sharing flows, e.g., content items that were shared together, bundled content pieces already identified as belonging together, e.g., from entities in a knowledge graph, etc. In some implementations, training data 391 can include examples of input data 392 that have been assigned labels 393 that correspond to output data 394.

In some implementations, machine-learned model 300 can be trained by optimizing an objective function, such as objective function 395. For example, in some implementations, objective function 395 may be or include a loss function that compares (e.g., determines a difference between) output data generated by the model from the training data and labels (e.g., ground-truth labels) associated with the training data. For example, the loss function can evaluate a sum or mean of squared differences between the output data and the labels. In some examples, objective function 395 may be or include a cost function that describes a cost of a certain outcome or output data. Other examples of objective function 395 can include margin-based techniques such as, for example, triplet loss or maximum-margin training.

One or more of various optimization techniques can be performed to optimize objective function 395. For example, the optimization technique(s) can minimize or maximize objective function 395. Example optimization techniques include Hessian-based techniques and gradient-based techniques, such as, for example, coordinate descent; gradient descent (e.g., stochastic gradient descent); subgradient methods; etc. Other optimization techniques include black box optimization techniques and heuristics.

In some implementations, backward propagation of errors can be used in conjunction with an optimization technique (e.g., gradient based techniques) to train machine-learned model 300 (e.g., when machine-learned model is a multi-layer model such as an artificial neural network). For example, an iterative cycle of propagation and model parameter (e.g., weights) update can be performed to train machine-learned model 300. Example backpropagation techniques include truncated backpropagation through time, Levenberg-Marquardt backpropagation, etc.

In some implementations, machine-learned model 300 described herein can be trained using unsupervised learning techniques. Unsupervised learning can include inferring a function to describe hidden structure from unlabeled data. For example, a classification or categorization may not be included in the data. Unsupervised learning techniques can be used to produce machine-learned models capable of performing clustering, anomaly detection, learning latent variable models, or other tasks.

Machine-learned model 300 can be trained using semi-supervised techniques which combine aspects of supervised learning and unsupervised learning. Machine-learned model 300 can be trained or otherwise generated through evolutionary techniques or genetic algorithms. In some implementations, machine-learned model 300 described herein can be trained using reinforcement learning. In reinforcement learning, an agent (e.g., model) can take actions in an environment and learn to maximize rewards and/or minimize penalties that result from such actions. Reinforcement learning can differ from the supervised learning problem in that correct input/output pairs are not presented, nor suboptimal actions explicitly corrected.

In some implementations, one or more generalization techniques can be performed during training to improve the generalization of machine-learned model 300. Generalization techniques can help reduce overfitting of machine-learned model 300 to the training data. Example generalization techniques include dropout techniques; weight decay techniques; batch normalization; early stopping; subset selection; stepwise selection; etc.

In some implementations, machine-learned model 300 described herein can include or otherwise be impacted by a number of hyperparameters, such as, for example, learning rate, number of layers, number of nodes in each layer, number of leaves in a tree, number of clusters; etc. Hyperparameters can affect model performance.

Hyperparameters can be hand selected or can be automatically selected through application of techniques such as, for example, grid search; black box optimization techniques (e.g., Bayesian optimization, random search, etc.); gradient-based optimization; etc. Example techniques and/or tools for performing automatic hyperparameter optimization include Hyperopt; Auto-WEKA; Spearmint; Metric Optimization Engine (MOE); etc.

In some implementations, various techniques can be used to optimize and/or adapt the learning rate when the model is trained. Example techniques and/or tools for performing learning rate optimization or adaptation include Adagrad; Adaptive Moment Estimation (ADAM); Adadelta; RMSprop; etc.

In some implementations, transfer learning techniques can be used to provide an initial model from which to begin training of machine-learned model 300 described herein.

In some implementations, machine-learned model 300 described herein can be included in different portions of computer-readable code on a computing device. In one example, machine-learned model 300 can be included in a particular application or program and used (e.g., exclusively) by such particular application or program. Thus, in one example, a computing device can include a number of applications and one or more of such applications can contain its own respective machine learning library and machine-learned model(s).

In another example, machine-learned model 300 described herein can be included in an operating system of a computing device (e.g., in a central intelligence layer of an operating system) and can be called or otherwise used by one or more applications that interact with the operating system. In some implementations, each application can communicate with the central intelligence layer (and model(s) stored therein) using an application programming interface (API) (e.g., a common, public API across all applications).

In some implementations, the central intelligence layer can communicate with a central device data layer. The central device data layer can be a centralized repository of data for the computing device. The central device data layer can communicate with a number of other components of the computing device, such as, for example, one or more sensors, a context manager, a device state component, and/or additional components. In some implementations, the central device data layer can communicate with each device component using an API (e.g., a private API).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination.

Databases and applications can be implemented on a single system or distributed across multiple systems. Distributed components can operate sequentially or in parallel.

In addition, the machine learning techniques described herein are readily interchangeable and combinable. Although certain example techniques have been described, many others exist and can be used in conjunction with aspects of the present disclosure.

A brief overview of example machine-learned models and associated techniques has been provided by the present disclosure. For additional details, readers should review the following references: Machine Learning A Probabilistic Perspective (Murphy); Rules of Machine Learning: Best Practices for ML Engineering (Zinkevich); Deep Learning (Goodfellow); Reinforcement Learning: An Introduction (Sutton); and Artificial Intelligence: A Modern Approach (Norvig).

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity, or content to be displayed, may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 8:
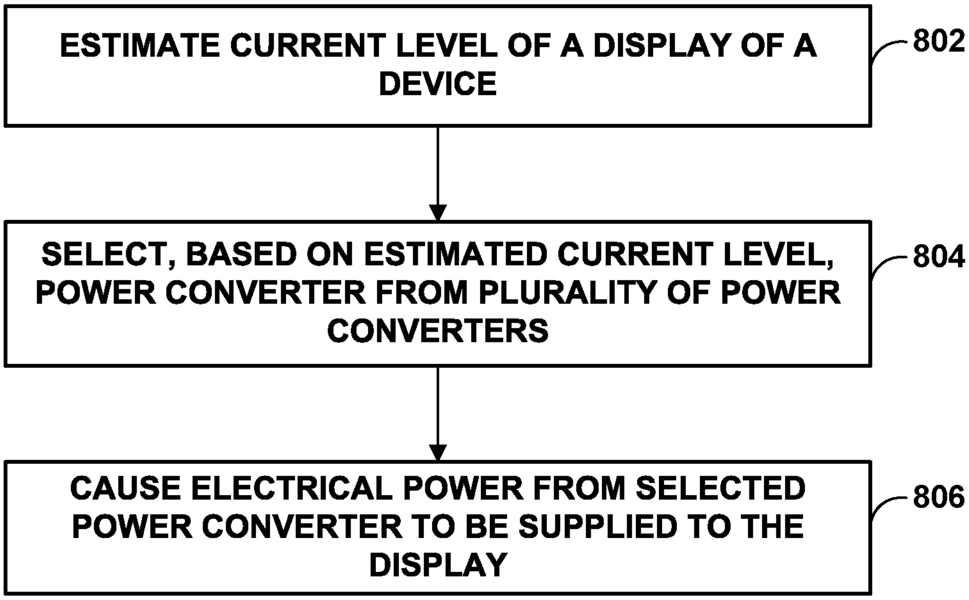
FIG. 8 is a flowchart illustrating example operations of an example controller configured to dynamically select a power converter from a plurality of power converters, in accordance with one or more aspects of the present disclosure.

FIG. 8 is a flowchart illustrating example operations of an example controller configured to dynamically select a power converter from a plurality of power converters, in accordance with one or more aspects of the present disclosure. The operations of controller 10 are described within the context of device 2 of FIG. 1 and FIG. 3.

Controller 10 may estimate a current level of a display of a device (802). For instance, controller 10 may estimate an amount of current to be utilized by display 12 at a future time. As discussed above, controller 10 may estimate the current level based on any number of factors including one or both of a brightness setting of display 12 and content to be displayed by display 12.

Controller 10 may select, based on the estimated current level, a power converter from a plurality of power converters (804). For instance, controller 10 may select a power converter of power converters 20 that operates the most efficiently (e.g., as compared to other power converters of power converters 20) at the estimated current level.

Controller 10 may cause electrical power from the selected power convert to be supplied to the display (806). For instance, where power converters 20 are switched mode power converters, controller 10 may operate the selected power converter and not operate the other power converters of power converters 20. In examples where device 2 includes a multiplexer (e.g., multiplexer 8 of FIG. 1), controller 10 may output a signal that causes the multiplexer to route power from the selected power converter to display 12.

In some examples, controller 10 may perform one or more actions to verify the power estimations. For instance, controller 10 may determine an actual amount of power used by the display at the future time, and compare the actual amount of power with the estimated amount of power. The difference between the actual amount of power used and the estimated amount of power may be referred to as error (e.g., $P_{error}=P_{actual}-P_{estimated}$). Based on the comparison, controller 10 may determine whether to update a model of the display. For instance, if the error satisfies a threshold (e.g., if the error is greater than 10% of the estimated amount of power), controller 10 may determine to update the model used to generate the estimated amount of power. As one example, controller 10 may retrain a machine learning model (e.g., ML model 604). As another example, controller 10 may update coefficients of an analytical model, such as the analytical model used to predict emission power. In this way, controller 10 may use feedback to improve power predictions.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects have been described in this disclosure. These and other aspects are within the scope of the following claims.

The invention claimed is:

1. A method comprising:

estimating, based on content to be displayed at a display of a mobile computing device at a future time, an amount of power to be used by the display at the future time, wherein estimating the amount of power comprises estimating, using a machine learning model, an emission amount of power;

selecting, based on the estimated power level, a power converter of a plurality of power converters of the mobile computing device, each of the plurality of power converters optimized for a different output power range; and causing electrical power from the selected power converter to be supplied to the display at the future time.

2. The method of claim 1, wherein estimating the amount of power further comprises estimating the amount of power based on a brightness setting of the display.

3. The method of claim 1, wherein estimating the amount of power comprises:

estimating a data amount of power;

estimating a gate driving amount of power; and estimating the amount of power to be used by the display at the future time based on the emission amount of power, the data amount of power, and the gate driving amount of power.

4. The method of claim 1, wherein each power converter of the plurality of power converters is optimized for a different output power range, and wherein selecting the power converter comprises identifying which of the plurality of power converters has an output power range that matches the estimated amount of power.

5. The method of claim 1, wherein estimating the amount of power comprises estimating the amount of power based on a model of the display, the method further comprising:

determining an actual amount of power used by the display at the future time;

comparing the actual amount of power with the estimated amount of power; and determining, based on the comparison, whether to update the model of the display.

6. The method of claim 1, wherein the display comprises an organic light emitting diode (OLED) display.

7. A device comprising:

a display;

a plurality of power converters configured to supply electrical power to the display, each optimized for a different output power range; and circuitry configured to:

estimate, based on content to be displayed at the display at a future time, an amount of power to be used by the display at the future time, wherein, to estimate the amount of power, the circuitry is configured to estimate, using a machine learning model, an emission amount of power;

select, based on the estimated power level, a power converter of the plurality of power converters; and cause electrical power from the selected power converter to be supplied to the display at the future time.

8. The device of claim 7, wherein, to estimate the amount of power, the circuitry is configured to estimate the amount of power based on a brightness setting of the display.

9. The device of claim 7, wherein, to estimate the amount of power, the circuitry is configured to:

estimate a data amount of power;

estimate a gate driving amount of power; and estimate the amount of power to be used by the display at the future time based on the emission amount of power, the data amount of power, and the gate driving amount of power.

10. The device of claim 7, wherein each power converter of the plurality of power converters is optimized for a different output power range, and wherein, to select the power converter, the circuitry is configured to identify which of the plurality of power converters has an output power range that matches the estimated amount of power.

11. The device of claim 7, wherein, to estimate the amount of power, the circuitry is configured to estimate the amount of power based on a model of the display, and wherein the circuitry is further configured to:

determine an actual amount of power used by the display at the future time;

compare the actual amount of power with the estimated amount of power; and determine, based on the comparison, whether to update the model of the display.

12. The device of claim 7, wherein the display comprises an organic light emitting diode (OLED) display.

13. A computer-readable storage medium storing instructions that, when executed, cause one or more processors of a device that includes a plurality of power converters to:

estimate, based on content to be displayed at the display at a future time and using a machine learning model, an amount of power to be used by the display at the future time, wherein the instructions that cause the one or more processors to estimate the amount of power comprise instructions that cause the one or more processors to estimate, using a machine learning model, an emission amount of power;

select, based on the estimated power level, a power converter of the plurality of power converters, wherein each of the plurality of power converters is optimized for a different output power range; and cause electrical power from the selected power converter to be supplied to the display at the future time.

14. The computer-readable medium of claim 13, wherein the instructions that cause the one or more processors to estimate the amount of power comprise instructions that cause the one or more processors to:

estimate a data amount of power;

estimate a gate driving amount of power; and estimate the amount of power to be used by the display at the future time based on the emission amount of power, the data amount of power, and the gate driving amount of power.

15. The computer-readable medium of claim 13, wherein the instructions that cause the one or more processors to estimate the amount of power comprise instructions that cause the one or more processors to estimate the amount of power based on a model of the display, and further comprising instructions that cause the one or more processors to:

determine an actual amount of power used by the display at the future time;

compare the actual amount of power with the estimated amount of power; and determine, based on the comparison, whether to update the model of the display.

* * * * *